Inventors:
James E. Shockroo,
Joseph L. McMorrow,
by Harold Levine Att'y.

April 26, 1966   J. E. SHOCKROO ETAL   3,248,627
ELECTRICAL CONTROL DEVICE
Original Filed April 12, 1961   4 Sheets-Sheet 3

Inventors:
James E. Shockroo,
Joseph L. McMorrow,
by Harold Levine
Att'y.

April 26, 1966   J. E. SHOCKROO ETAL   3,248,627
ELECTRICAL CONTROL DEVICE

Original Filed April 12, 1961   4 Sheets-Sheet 4

Inventors:
James E. Shockroo,
Joseph L. McMorrow,
by Harold Levine Att'y.

United States Patent Office 3,248,627
Patented Apr. 26, 1966

3,248,627
ELECTRICAL CONTROL DEVICE
James E. Shockroo, Norton, and Joseph L. McMorrow, West Bridgewater, Mass., assignors to Texas Instruments Incorporated, Dallas, Tex., a corporation of Delaware
Continuation of application Ser. No. 102,482, Apr. 12, 1961. This application Nov. 13, 1964, Ser. No. 412,878
5 Claims. (Cl. 318—221)

This application is a continuation of application Serial No. 102,482, filed April 12, 1961, and now abandoned.

This invention relates to electrical control devices which are particularly suited for (though not limited to) controlling circuits for electrical motors having one or more windings. The invention, with regard to certain more specific features, is particularly concerned with the provision of a new and improved combined relay and motor protector.

Among the several objects of this invention may be noted the provision of an electrical control device for controlling the circuits of and protecting the windings of an electric motor, said control, when properly connected in a motor circuit, being adapted to provide so-called complete or total protection for the motor, as well as being effective to properly de-energize the start or phase winding of the motor as the motor comes up to speed; the provision of a control which is versatile in use, compact, low-cost, embodies a minimum number of parts; and the provision of a control which is simple in construction and economical to manufacture and assemble, and which provides for simple and low-cost installation on motors to which it is to be connected; and the provision of a control device of the class described, wherein the relay coil also serves as a heater for a thermally responsive switching or control means.

Other objects will be in part apparent and in part pointed out hereinafter.

The invention accordingly comprises the elements and combinations of elements, features of construction, and arrangements of parts which will be exemplified in the structures hereinafter described, and the scope of the application which will be indicated in the following claims.

In the accompanying drawings, in which one of the various possible embodiments of the invention is illustrated:

Similar reference characters indicate corresponding parts throughout the several views of the drawings.

Figure 1:
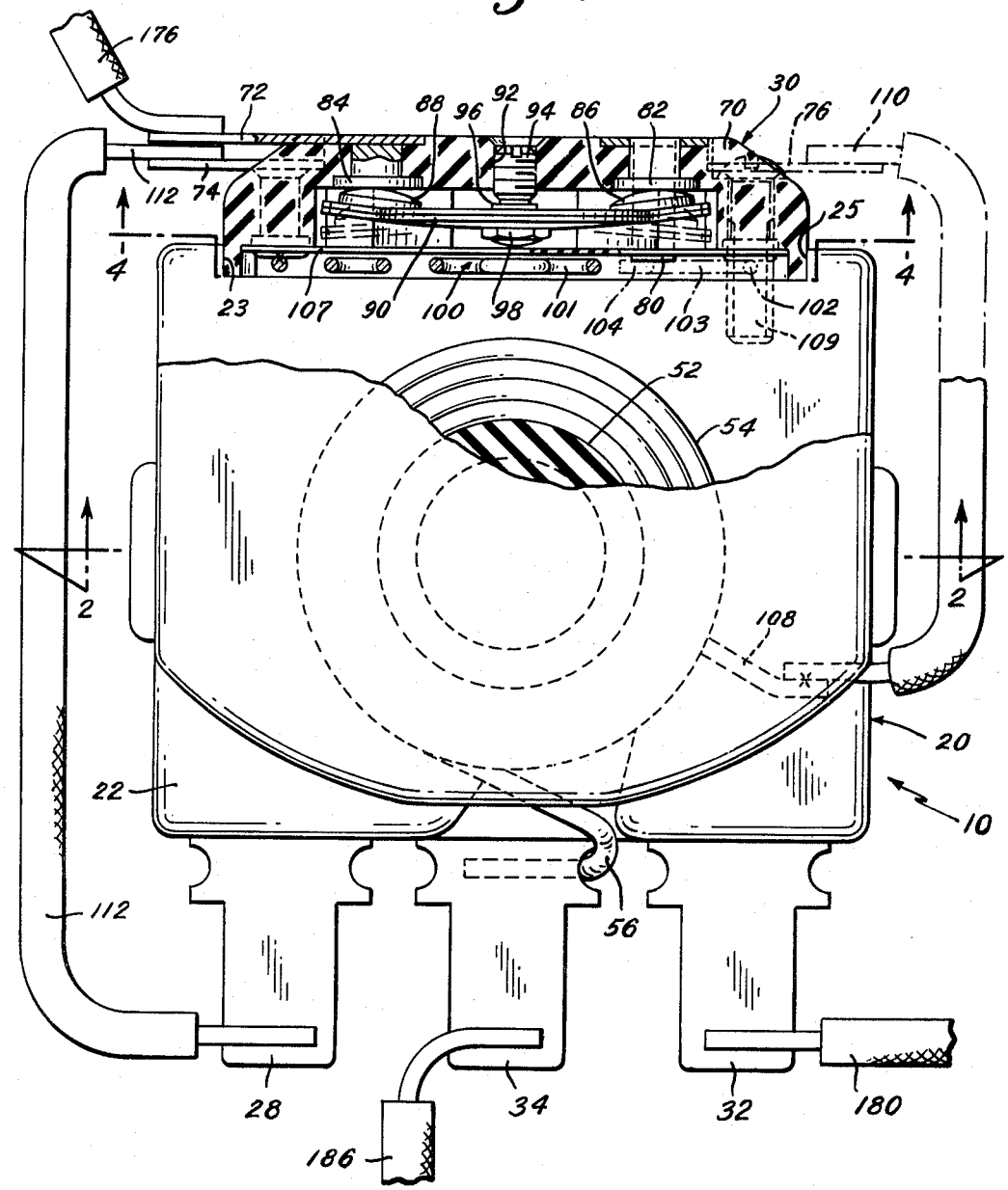
FIG. 1 is a top plan view of a control according to the present invention.

Dimensions of certain of the parts as shown in the drawings have been modified for the purposes of clarity of illustration.

Figure 2:
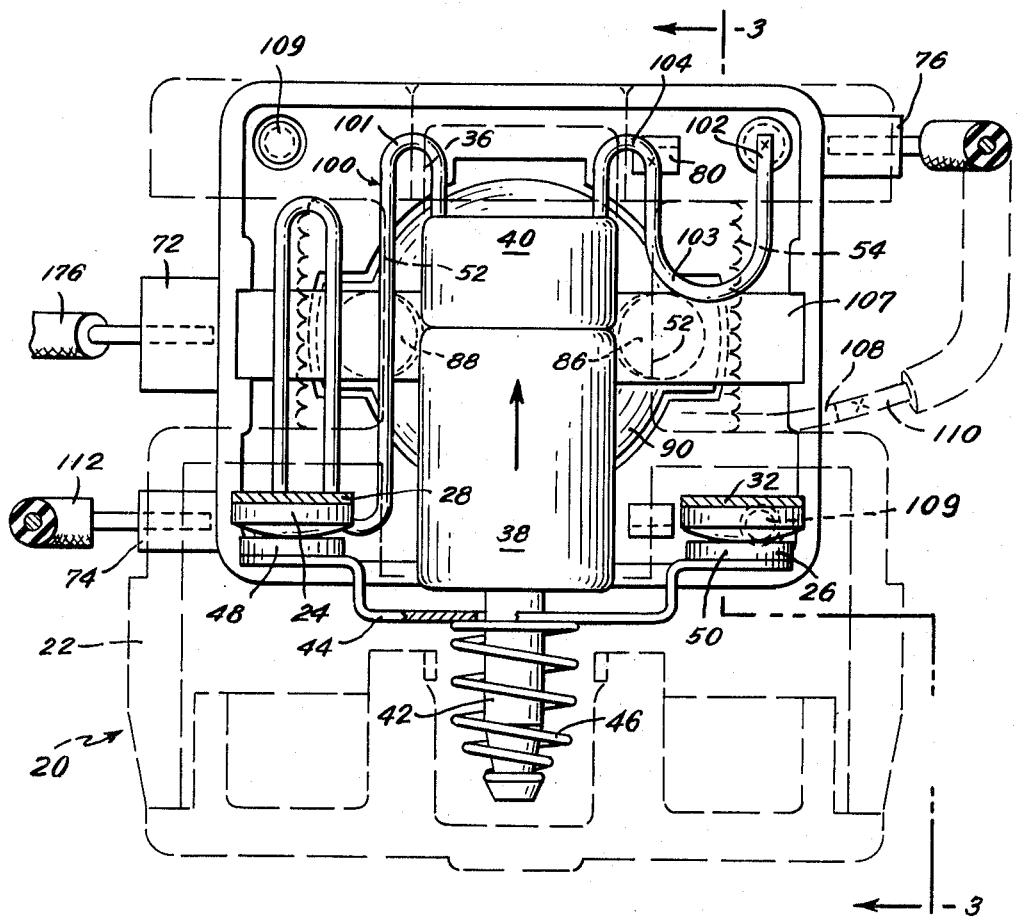
FIG. 2 is a view taken on line 2—2 of FIG. 1, with certain parts of the control shown in phantom for clarity of illustration.

Referring now to the drawings, particularly FIGS. 1–4, a novel control device embodying my invention is shown at numeral 10, and comprises a combination electrical relay and thermally responsive motor protector. The relay portion and thermally responsive protector portion of control 10 are generally indicated respectively by numerals 20 and 30. As best seen in FIG. 2, relay portion 20 may take the form of an electromagnetic relay, for example, such as that shown and described in a copending United States patent application to Aimé J. Grenier, entitled, "Electromagnetic Switching Mechanism," Serial No. 32,176, filed May 27, 1960, now Patent No. 3,099,725, issued July 30, 1963, and assigned to the assignee of the instant application, to which reference may be had for specific details of construction. Electromagnetic relay portion 20 generally includes a casing member 22, a pair of stationary contacts 24 and 26 carried respectively by terminals 28 and 32, each of the latter being formed of suitable electrically conductive material. Relay portion 20 also includes a third electrically conductive terminal 34 formed of suitable electrically conductive material.

Casing 22 is provided with a cylindrical bore or cavity 36 (see FIG. 2) in which is received an armature 38 and a non-magnetic slug or weight 40 of a plunger subassembly for reciprocal movement therein. The armature 38 is formed of a suitable magnetic material and includes a shank 42. An apertured movable bridging contact member 44 is slidably mounted on shank 42 for reciprocal movement thereon. As best seen in FIG. 2, spring 46 biases bridging contact member 44 for movement toward a contacts-closed position. Fixedly mounted and electrically connected to opposite ends of the bridging member, is a pair of electrical contacts 48 and 50, which are adapted to mate respectively with contacts 24 and 26.

Figure 3:
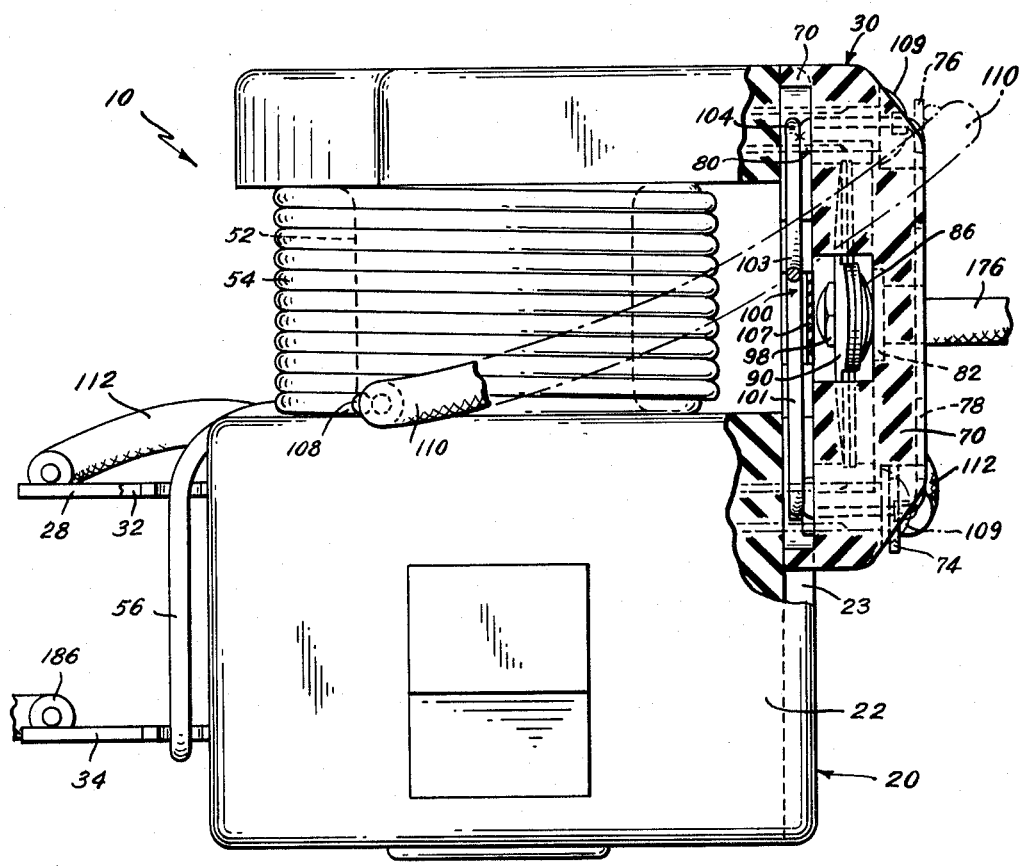
FIG. 3 is a view taken on line 3—3 of FIG. 2, with certain parts shown in section for clarity of illustration.

Housing 22 also provides a cylindrical spool portion 52 (as best seen in FIG. 3) about which is disposed a plurality of mutually insulated turns of electrically conductive wire, which form a coil 54. As best seen in FIGS. 1 and 3, one end 56 of coil 54 is electrically connected to terminal 34. It will be clear that when coil 54 is electrically energized by a predetermined value of current flowing therethrough, magnetic armature 38 will be moved upwardly, in the direction of the arrow shown in FIG. 2, to close contacts 24, 48 and 26, 50. When the current flowing through coil 54 goes below this predetermined value, armature 38 and non-magnetic slug 40 will move downwardly, as seen in FIG. 2, to open contacts 24, 48 and 26, 50.

Protector portion 30 comprises a thermostatic switch of the type which is adapted to provide for so-called complete or total protection for the windings of a motor. An example of a thermostatic switch suitable for the present invention, is shown and described in FIGS. 8 and 9 of a copending U.S. patent application of James E. Shockroo and Walter H. Moksu, entitled "Thermally-Responsive Switches," Serial No. 841,237, filed September 21, 1959, now Patent No. 2,996,590, issued August 15, 1961, and assigned to the assignee of the instant invention, to which application reference may be made for specific details of construction.

Figure 4:
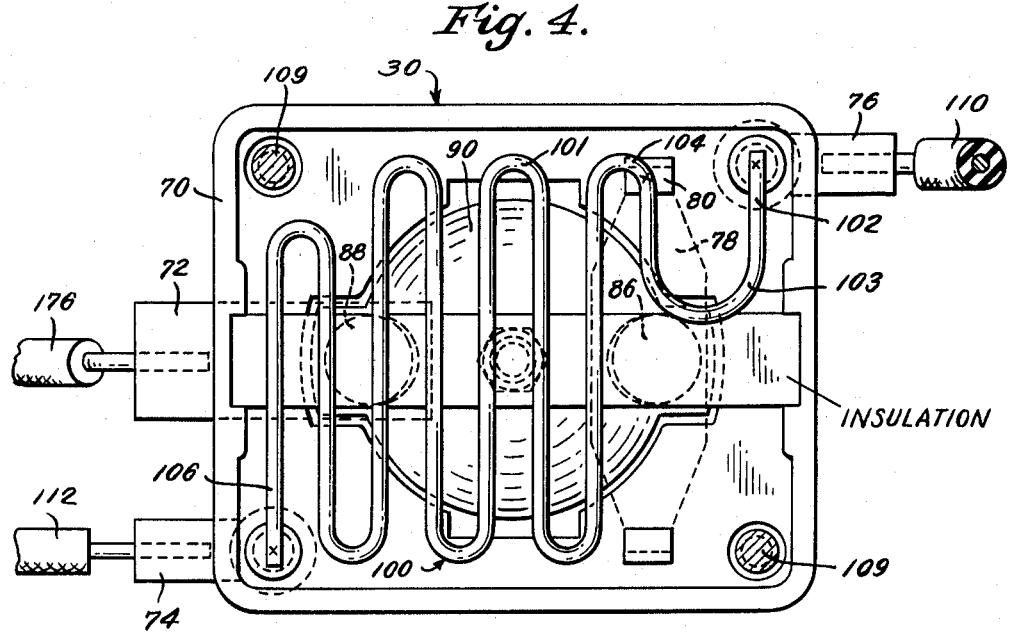
FIG. 4 is a view of a part of the control shown in FIG. 1, taken on line 4—4 of FIG. 1.

Protector portion 30 generally comprises (as best seen in FIGS. 1 and 4) a base member 70 formed of a conventional, electrically insulating material, such as a moldable phenolic resinous material or a molded ceramic material. As best seen in FIG. 4, protector portion 30 includes three electrically conductive terminals 72, 74 and 76 and an elongated terminal contact element 78. Element 78 provides, at a portion intermediate its ends, an electrical contact 82, and an upstanding, bent-over portion 80 to which a heater element is secured, as will be described in greater detail below. Terminal 72 provides an electrical contact 84, as best seen in FIG. 1. Base 70 is provided with a threaded opening 92 which receives, in threaded engagement therewith, a threaded mounting post or adjusting screw 94. Mounted on the inner end of mounting post or screw 94 is a snap-acting, composite, thermostatic element 90, which may, for example, be a dished, bimetallic disc or element, such as that shown and described in the Spencer U.S. Patent No. 1,448,240 or in the Vaughan et al. U.S. Patent No. 2,317,831. Element 90 is mounted on screw 94 by means of proper shoulders or abutments, such as at 96 and 98, in a manner such as that described in the Spencer and Vaughan patents referred to above. Adjusting screw 94 is accessible externally of base 70, and may be rotated to adjust the operating temperature and characteristics of snap-acting element 90, as described in the Spencer and Vaughan patents referred to above. Thermostatic element 90 mounts a pair of contacts 86 and 88, which are respectively engageable with contacts 82 and 84, as best seen in FIG. 1.

Protector portion 30 also includes a heater element indicated generally by numeral 100, as best seen in FIGS. 1 and 4. Heater element 100 is formed of suitable electrical resistance material, and is illustrated as being serpentine and wire-like in form, but may, for example, be in strip, ribbon or other forms.

Heater element 100 is electrically connected, as by welding at one end 102 to terminal 76 and at its other end 106 to terminal 74, as best seen in FIGS. 1 and 4. Heater element 100 is also electrically connected, intermediate its ends, as by welding, at a portion 104 thereof, to the upper surface of bent-over portion 80 of element 78, as best seen in FIG. 4. This arrangement provides two heater segments 101 and 103; segment 101 extending between portion 104 and end 106; and segment 103 extending between portion 104 and end 102.

Heater element 100, when mounted on the base and electrically secured to the terminals, as described above, is suspended directly above the thermostatic element 90 and is not in contact with either the base or the thermostatic element. This arrangement provides sufficient electrical clearance and mounts the heater element in good thermal heat-transfer relation or thermally conductive juxtaposition with element 90. Electrically insulating strip or layer 107 formed, for example, of mica, is disposed between the thermal element 90 and the heater 100, as best seen in FIGS. 1 and 4.

Control device 10 is adapted for electrical connection with the main and start windings of a split-phase electrical motor to provide complete or total protection for both the start and main windings, separately as well as both of them combined, against abnormal conditions which can cause overheating and burnout of the windings such as, for example, described in the aforementioned copending application of James E. Shockroo and Walter H. Moksu.

According to our invention, protector portion 30 is mounted on relay portion 20 by any convenient means, such as screw fasteners 109, illustrated in FIG. 3, so that thermally responsive element 90 is in close radiant and convective thermal heat-transfer relation to coil 54, whereby the latter acts as a heater for the thermally responsive element 90. Protector portion 30 is received within a recess in housing 22 defined by walls 23 and 25 (see FIG. 1) so as to mount thermal element 90 in close thermal juxtaposition to coil 54. As will be more apparent from the ensuing description, coil 54 is adapted for electrical series connection with the run winding of a motor, and heater segment 101 is adapted for electrical series connection with the start winding of a motor. Thus, segment 101 and coil 54, serve respectively as start and run winding heaters for thermally responsive element 90 to provide for total protection of the motor. Further, heater segment 103 is also adapted for series electrical connection with the running or main winding of a motor and may serve as a supplementary run winding heater when necessary. With the arrangement described above, the influence of the temperature of each of the heaters 54, supplemental run winding heater 103 and start winding heater 101 is very quickly felt by the thermal element 90.

Further, according to another aspect of our invention, the relay coil 54 is preferably formed of wire of a size selected in accordance with the size of the main winding or wire forming the main winding, to provide a predetermined size relation therebetween, and to furnish heat to the thermal element 90 to simulate or at least closely approximate the condition which would result if the thermally responsive, snap-acting element 90 were mounted directly on and in thermal contact with the main winding of the motor.

The aforementioned predetermined size relationship between the wire forming the relay coil and that of the motor main winding will be governed by factors such as the ambient conditions to which the motor winding and control are subjected, and the relative materials forming the motor winding and relay coil. For example, in some cases, where the control 10 is mounted for inherent protection, as on the end bell of the motor, and is subject to substantially the same ambient conditions as that of the main winding of the motor, it is preferred that coil 54 be formed of magnet wire (copper wire) of a size which is approximately one or two sizes smaller than that of the wire forming the main winding.

Terminal 76 is electrically connected, as by welding or soldering, to the other end 108 of relay coil 54 by means of electrical conductor 110, as best seen in FIGS. 1 and 3. Terminal 74 of protector portion 30 is electrically connected to terminal 28 of relay portion 20 by means of an electrical conductor 112, as best seen in FIGS. 1 and 3.

The combined relay-protector control 10 may be quickly and easily installed electrically connected to a motor by making the proper electrical connection with only three terminals, namely, terminals 72, 32 and 34. The small number of terminal connections required has the advantage of minimizing the danger of improper orientation and installation of the control with a motor, as well as providing for simple and low-cost installation.

Figure 5:
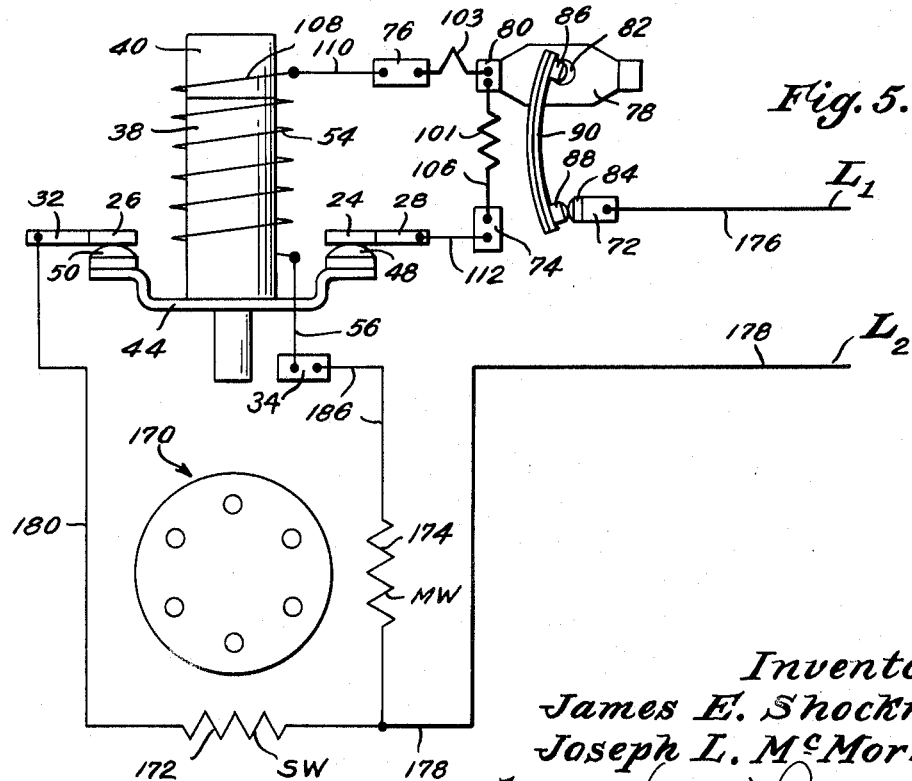
FIG. 5 is an exemplary schematic wiring diagram for the control illustrated in FIGS. 1–4, shown in combination with a split-phase electrical motor.

Referring now to the circuit diagram of FIG. 5, the control 10 is schematically illustrated in an exemplary circuit with a motor 170 having an auxiliary start or phase winding 172 and a main or running winding 174, the phase winding 172 and the main winding 174 being respectively indicated in FIG. 5 by the letters SW and MW. One power supply line $L_1$ is connected by a conductor 176 to terminal 72. The other side of the power supply line $L_2$ is connected by conductor 178 to the common connection between the start winding 172 and the main winding 174 of the motor indicated generally by the numeral 170. The other end of the start winding 172 is connected by a conductor 180 to terminal 32. The other end of the main or running winding 174 is connected by conductor 186 to terminal 34.

As thus connected, it will be observed that the current in the starting winding flows from $L_1$, one side of the power supply line, through conductor 176, to terminal 72, to contact 84, to contact 88, through snap-acting, thermally responsive element 90, to contact 86, then to contact 82, through contact element 78, to bent-over portion 80, then through the start winding heater segment 101, to terminal 74, then by conductor 112, to terminal 28, to contact 24, to bridging contact 48, through briding element 44, to bridging contact 50, to contact 26, to terminal 32, then by conductor 180 to the start winding 172, to its common connection with the main winding 174 and then through conductor 178 to $L_2$, the other side of the power source.

Current through the main or running winding 174 flows from $L_1$, through conductor 176, to terminal 72, to contact 84, to contact 88, through snap-acting thermal element 90, to contact 86, then to contact 82, through contact element 78, to bent-over portion 80, then through heater segment 103 to terminal 76, through conductor 110, to end 108 of coil 54, then serially through coils 54, to end 56 thereof, to terminal 34, then by conductor 186, to the main winding 174, to its common connection with the start winding 172, and then by conductor 178, to $L_2$, the other side of the power source.

The operation of control device 10 in the exemplary circuit described above is as follows: When the circuit of FIG. 5 is energized, to energize motor 170, a relatively large initial run winding current will energize coil 54 and cause armature 38 to move upwardly, as seen in FIG. 5, to move the normally open bridging contacts 48 and 50 into respective engagement with contacts 24 and 26 to close the circuit for start winding 172. As the motor 170 comes up to speed, the run winding current will diminish and consequently diminish the level of energization in coil 54 to the point where armature 38 will move downwardly, as seen in FIGS. 2 and 5, to quickly open contacts 24, 48 and 26, 50 to de-energize the start winding 172. Thereafter, line or run winding current will continue to traverse the thermal element 90, heater segment 103 and coil 54. Under normal operating conditions of the motor 170 (after the start winding has been de-energized) the heat generated by the main winding current passing through the thermally responsive element 90, heater segment 103 and coil 54 together with the heat of the motor (if control 10 is mounted for inherent protection, so as to be subject to the heat of the motor) will not be sufficient to raise the temperature of the thermally responsive element 90 to a point where it snaps to its position of opposite concavity (if it is of the snap-acting type) or moves a distance (if it is of the creep-acting type) to open the electrical contacts 84, 88 and 82, 86 to de-energize the motor. If, however, the motor (before or after the start winding is de-energized) becomes subject to one or more abnormal conditions, such as those described in the copending application of Shockroo et al. referred to above, the heavy starting and/or run winding currents will influence their respective heaters (segments 101 and 103, and coil 54) to cause the latter to move to open the circuits of both windings, thus protecting the motor windings from overheating.

One example of such an abnormal condition is where the motor is so heavily overloaded that the rotor cannot turn, then the heavy starting and/or run winding currents will influence their respective heaters (heater 101 in the case of the start winding; and heater 103 and coil 54 in the case of the running winding) as well as the thermal element 90, to cause the latter to move to open the circuits of both windings, thus protecting the motor windings from overheating.

Another example is where the motor has been running and the starting winding is not in the circuit (contacts 26, 50 and 24, 48 are in the normally open condition) and the motor becomes overloaded or there is a locked rotor condition with the main winding only in the circuit, the excess current in the running winding 174 will raise the temperature of the coil 54 and heater segment 103, as well as that of the thermal element 90, and (according to the calibration of the thermal element 90) the effect of the heat from the coil 54 and heater segment 103, will, after a time, be sufficient to cause the thermal element 90 to move to open the circuit before the windings are damaged. Thermal element 90 also protects the start winding 172 should the relay fail to open contacts 26, 50 and 24, 48 to de-energize the start winding at the appropriate time. Control device 10, in the circuit as illustrated in FIG. 5, is effective to protect motor 170 against all of the other abnormal conditions, described in the aforementioned copending Shockroo et al. application to provide so-called complete or total protection.

From the above, it can be seen that the combined relay-protector control 10 of our invention, advantageously affords a compact, low-cost control having a minimum number of parts wherein the relay coil 54 serves a dual function, namely, that of an energizing coil for the armature 38, and also serves as a main winding heater for the thermally responsive disc 90 of the protector portion 30 which, in co-operation with heater segment 101, provides for so-called complete or total motor protection, in addition to properly de-energizing the starting winding as the motor comes up to speed. Control 10 uniquely, in addition to providing total protection for motor 170, also protects the coil 54 and the relay from damage which could result if the relay were subjected to prolonged excessive current or temperature conditions.

It should be understood that where less than so-called total or complete protection is required or desired, heater 100 may be omitted, in which case, coil 54 will be the only remaining heater.

It will also be clear that the control of the present invention is susceptible to diverse applications in control circuits other than that illustrated by way of example in FIG. 5. For example, the control 10 can be mounted so as to provide so-called remote protection or so-called inherent protection, and could be employed with multi-speed, dual voltage, or other electric motors or energy-translating devices having one, two or more than two windings.

In view of the above, it will be seen that the several objects of the invention are achieved, and other advantageous results attained.

As many changes could be made in the above constructions without departing from the scope of the invention, it is intended that all matter contained in the above description or shown in the accompanying drawings, shall be interpreted as illustrative and not in a limiting sense, and it is also intended that the appended claims shall cover all such equivalent variations as come within the true spirit and scope of the invention.

We claim:

1. An electrical switching device for controlling an electrical energy-translating device having at least two windings; said switching device comprising a pair of electrical contacts for controlling a circuit for one of said windings; said switching device including a coil and an armature associated in a magnetic circuit with said coil; said armature mounted to actuate said contacts when said coil is energized by a predetermined flow of electrical current therethrough; said switching device including a further pair of electrical contacts; one of said further pair of electrical contacts being electrically connected with said coil; a thermally responsive element electrically connected to and mounting one of said further pair of electrical contacts for movement into and out of engagement with the other of said further pair of electrical contacts at predetermined temperature and current conditions; said coil being electrically connectable in series with the other of said windings; and said element mounted in non heat conductive, spaced relation to said coil to receive heat therefrom by radiation and convection whereby said coil acts as an electrical heater for said thermally responsive element.

2. The device as set forth in claim 3 and wherein said coil is formed of wire having a wire size selected according to the size of the wire used in said other of said windings to provide a predetermined size relationship therebetween.

3. The device as set forth in claim 1 and wherein one of said further pair of electrical contacts is electrically connected in series with said coil and in series with said first-named pair of contacts.

4. The switching device as set forth in claim 3 and wherein said thermally responsive element comprises a snap-acting member having a deformed portion therein responsible for its snap action.

5. An electrical switching device for controlling an electrical energy-translating device having at least two windings; said switching device including an electrical relay unit; said relay unit including a housing formed of electrical and heat insulating material; a pair of electrical contacts disposed within said housing for controlling a circuit for one of said windings; said housing including a spool portion; a coil disposed about said spool portion; an armature disposed within said housing and associated in a magnetic circuit with said coil; said armature mounted to actuate said contacts when said coil is energized by a predetermined flow of electrical current therethrough; said electrical switching device further including a thermally responsive switching unit; said thermally responsive switching unit including a pair of electrical contacts, one of which is electrically connected with said coil; said thermally responsive unit including a thermally responsive element arranged to move one of said pair of thermally responsive electrical switch contacts into and out of engagement with the other of said pair of thermally responsive electrical switch contacts at predetermined temperature and current conditions; said thermally responsive switch unit being mounted on said relay unit housing adjacent the spool portion thereof with said thermally responsive element positioned in non heat conductive, spaced relation to said coil to receive heat therefrom by radiation and convection whereby said coil acts as an electrical heater for said thermally responsive element.

References Cited by the Examiner
UNITED STATES PATENTS

| | | | |
|---|---|---|---|
| 1,997,673 | 4/1935 | Boothby | 318—221.1 |
| 2,182,773 | 12/1939 | Sachs | 200—122 |
| 2,521,120 | 9/1950 | Harrold | 318—221.1 |

ORIS L. RADER, *Primary Examiner.*

JOHN F. COUCH, *Examiner.*